United States Patent
Hein

(10) Patent No.: US 6,781,829 B2
(45) Date of Patent: Aug. 24, 2004

(54) DEVICE FOR REDUCING THE NOISE LEVEL OF A COMPONENT WITH MOVING PARTS AND FOR COOLING THE SAME

(75) Inventor: Holger Hein, Augsburg (DE)

(73) Assignee: Fujitsu Siemens Computers GmbH, München (DE)

(*) Notice: Subject to any disclaimer, the term of this patent is extended or adjusted under 35 U.S.C. 154(b) by 0 days.

(21) Appl. No.: 10/181,931

(22) PCT Filed: Feb. 13, 2001

(86) PCT No.: PCT/DE01/00545

§ 371 (c)(1),
(2), (4) Date: Aug. 29, 2002

(87) PCT Pub. No.: WO01/61702

PCT Pub. Date: Aug. 23, 2001

(65) Prior Publication Data

US 2003/0090871 A1 May 15, 2003

(30) Foreign Application Priority Data

Feb. 18, 2000 (DE) .......................... 100 07 419

(51) Int. Cl.$^7$ ................................ G06F 1/20
(52) U.S. Cl. .................. 361/687; 361/752; 165/80.3; 165/185; 174/52.2; 360/97.01; 360/106; 52/144; 181/151; 181/283
(58) Field of Search ................. 361/687, 688, 361/684–686, 724–727, 695, 679, 736, 752; 165/185, 80.3; 174/52.2, 16.3; 181/151, 200, 202, 282, 283, 286; 360/97.01–97.03, 106; 52/144, 145, 793.1, 787.11

(56) References Cited

U.S. PATENT DOCUMENTS

| | | | | |
|---|---|---|---|---|
| 5,510,954 A | * | 4/1996 | Wyler | 361/685 |
| 5,751,549 A | * | 5/1998 | Eberhardt et al. | 361/687 |
| 6,005,768 A | * | 12/1999 | Jo | 361/685 |
| 6,021,612 A | * | 2/2000 | Dunn et al. | 52/144 |
| 6,104,608 A | * | 8/2000 | Casinelli et al. | 361/692 |
| 6,154,360 A | * | 11/2000 | Kaczeus et al. | 361/685 |
| 6,198,627 B1 | * | 3/2001 | Roehling et al. | 361/688 |
| 6,243,262 B1 | * | 6/2001 | Koo et al. | 361/687 |

FOREIGN PATENT DOCUMENTS

| | | |
|---|---|---|
| DE | 31 12 591 | 10/1982 |
| DE | 197 14 835 | 10/1998 |
| DE | 299 05 525 U1 | 3/1999 |
| DE | 299 05 846 U1 | 3/1999 |
| EP | 90115290.0 | 7/1986 |
| EP | 93301990.3 | 3/1993 |
| EP | 97308655.6 | 10/1997 |
| WO | WO 93/24932 | 6/1993 |
| WO | WO 95/32457 | 5/1995 |

* cited by examiner

Primary Examiner—Lisa Lea-Edmonds
(74) Attorney, Agent, or Firm—Cohen, Pontani, Lieberman & Pavane

(57) ABSTRACT

The invention pertains to a device for reducing the noise level of, and for cooling, a Component (1) with moving parts, such as a hard disk in a PC system.

Figure 1:
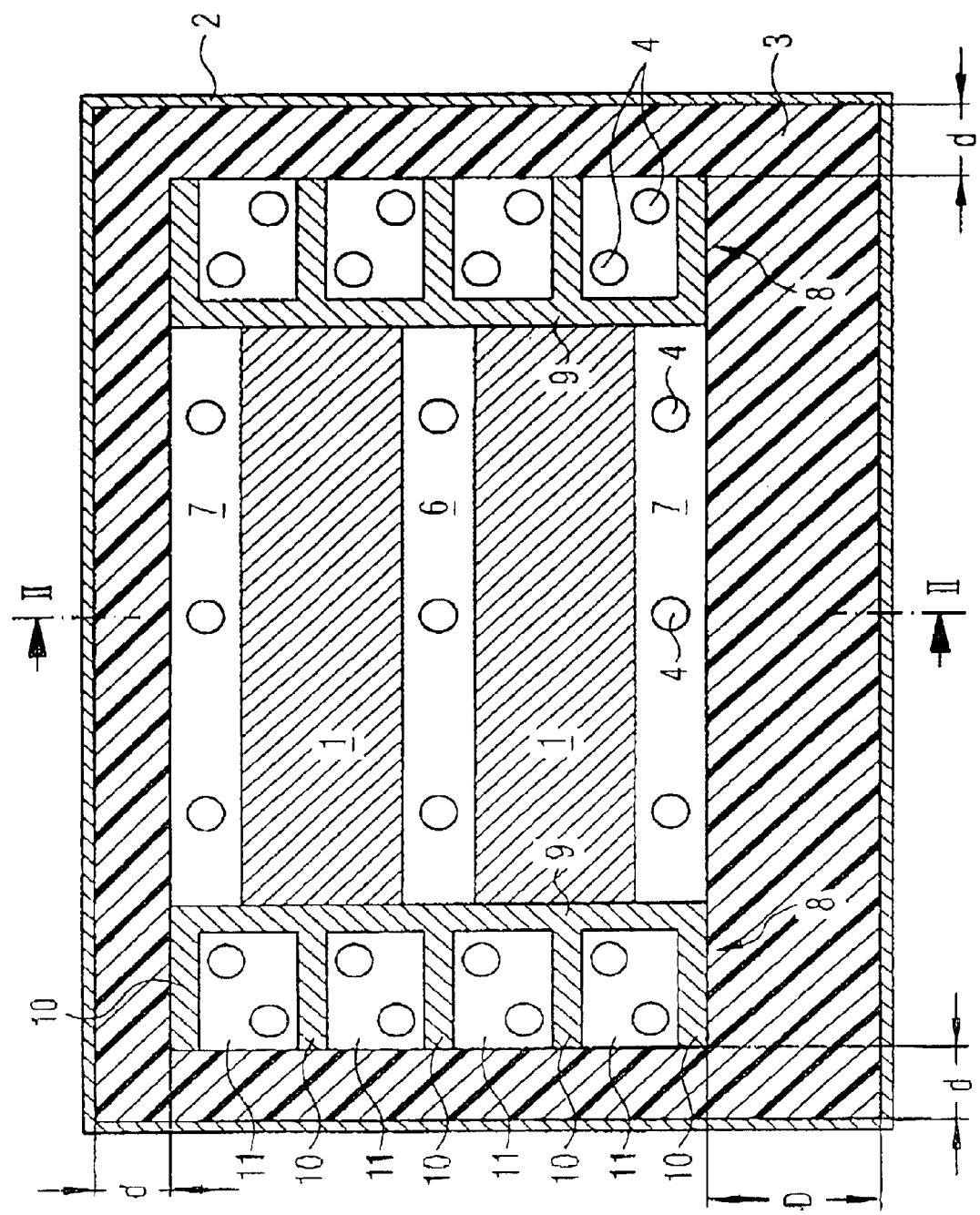

The device comprises a Container (2) in which Component (1) is arrayed and in which Ventilation Openings (4) are provided on opposing sides, through which an air stream can flow for cooling the component.

In accordance with the invention, Component (1) is completely surrounded by Sound-muting Material (3) in Container (2) and Channels (5) are configured in Sound-muting Material (3) for adducing and exhausting the cooling air.

10 Claims, 2 Drawing Sheets

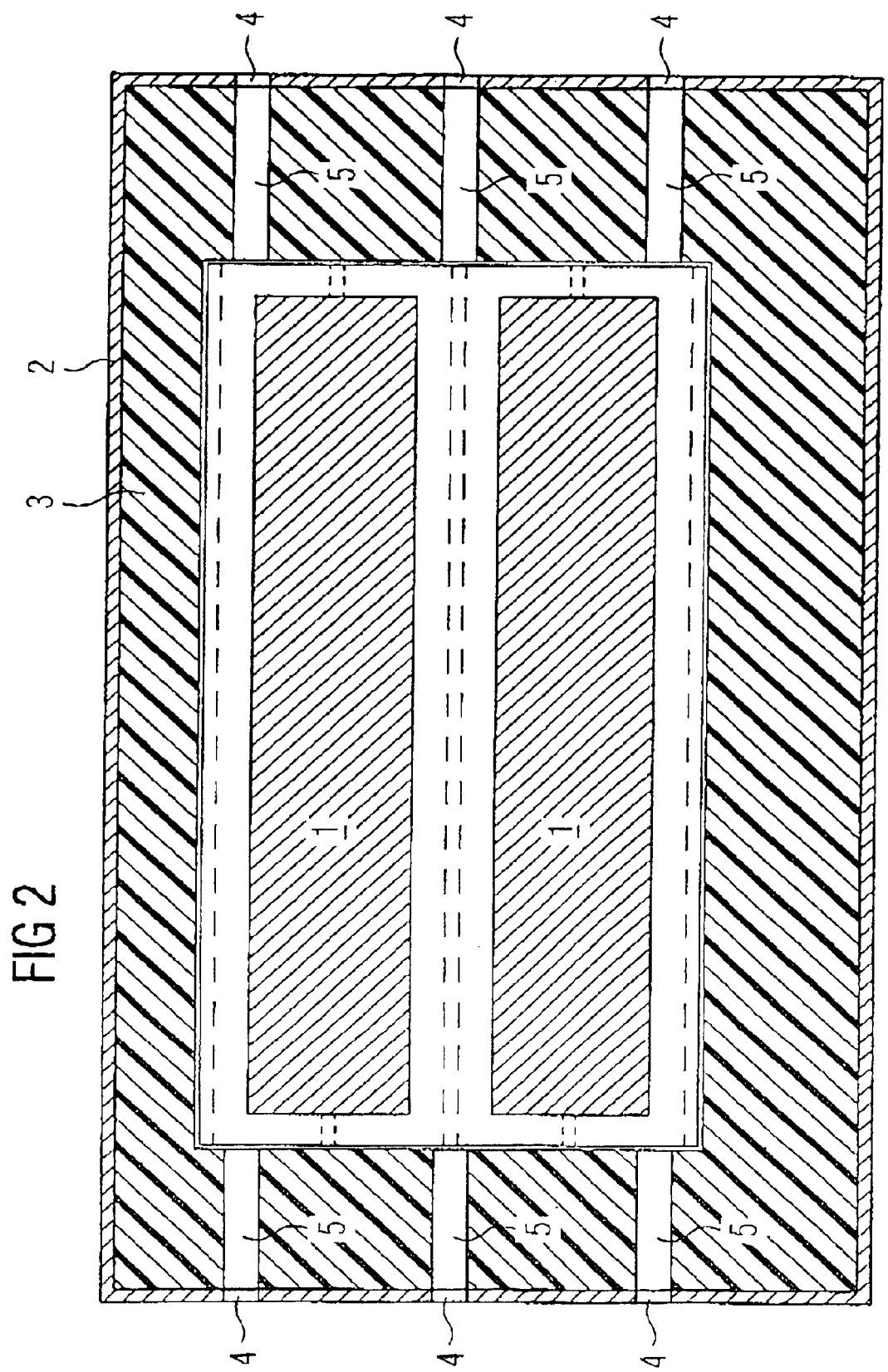

DEVICE FOR REDUCING THE NOISE LEVEL OF A COMPONENT WITH MOVING PARTS AND FOR COOLING THE SAME

This is a U.S. national stage of application No. PCT/DE01/00545, filed on Feb. 13, 2001.

The invention pertains to a device for reducing the noise level of, and for cooling, a component with moving parts, such as a hard disk in a PC system, with a container in which the component is arrayed and in which openings are provided on opposing sides, through which an air stream can flow for cooling the component.

A device of this kind is known, for example, through the German Utility Model bearing the official file number 29905525.6.

In this device, the component is supported from underneath by springs which press it against the top inside of the container. On the sides, there is a slight space between the component and the container, so that air can pass through the provided openings and can cool the component at its underside in the area of the springs.

In yet another known German Utility Model bearing the official file number 29905846.8, a hard disk is arrayed in a metal container, and the underside provided with an imbedded heavy-duty foil and the side walls with a layer of foam material.

Both known devices have the disadvantage of not yet sufficiently reducing the noise level.

The invention is therefore based on the purpose of further developing this species of device, such that the noise level is further reduced in spite of adequate cooling.

In the invention, this purpose is met by completely surrounding the component in the container with sound-muting material and by channels which conduct cooling air through the sound-muting material.

Owing to this arrangement, optimal sound-muting is achieved. The sound-muting material on all sides of the component reduces the noise level to the highest possible degree. Since the channels for the cooling air are likewise made of sound-muting material, the sound carried along by the cooling air is muted in this area as well.

Sound-muting by means of sound-muting material has a simultaneous insulating effect with respect to the heat produced by the component.

Therefore, optimal sound-muting must always be accompanied by the provision of increased cooling.

An advantageous further development of the invention therefore provides for at least one cooling unit adjacent to the component which is likewise cooled by an air stream via the openings in the container, to be adjacent to the component. For increased cooling, two or several cooling units may be provided per component.

Another arrangement for the purpose of increased cooling calls for having an air space between the top side as well as the underside of the component and the surrounding sound-muting material through which the cooling air can flow.

A third arrangement for the purpose of increased cooling calls for having the openings in the container arrayed directly opposite one another in true alignment, so that the airflow is straight.

Due to the linear array of the airflow, the cooling air is not impeded in its flow, which in turn produces a stronger flow and thus increased cooling.

The most appropriate array for the openings in the container is in the area of the air space between the component and the sound-muting material and in the area of the air-intake spaces of the cooling unit. This will ensure that the cooling air can flow in a linear manner past the component at the most effective locations.

Additional advantages of the invention are disclosed in the sub-claims and in the following description of figures.

Details of the invention are explained by means of an embodiment shown in the drawings.

The drawings show:

in FIG. 1 a cross-section through the device in accordance with the invention, and in FIG. 2 the section of II—II in FIG. 1.

FIG. 1 shows the cross-section of a device which serves the purpose of reducing the noise level and of cooling a Component 1 positioned therein. Component 1 (shown in diagram only) serves for use in a PC system and comprises movable parts which produce the noise. A hard disk may be an example of such a component.

In the illustrated embodiment, the device contains two Components 1, although it is also possible to include only one, or more than two.

Components 1 are arrayed in a Container 2 which is completely lined with Sound-muting Material 3. Ventilation Openings 4 are provided on Container 2 for cooling the Components 1. As is clearly visible in FIG. 2, which shows Section II—II of FIG. 1, these ventilation openings are arrayed on Container 2 directly opposite one another in true alignment. In Sound-muting Material 3, appropriate Channels 5 are provided at the locations of the Ventilation Openings 4, allowing the air to flow through for cooling the components.

Components 1 are arranged at a distance from each other by means of a Void 6 and, at the top side as well as the underside with respect to the Sound-muting Material 3 by means of a Void 7. Both in the area of Void 6 and in the Area of Voids 7, Ventilation Openings 4 are provided in Container 2, so that the cooling air can flow through the voids directly past the components.

Moreover, on the sides of Components 1, Cooling Units 8 are arrayed which essentially comprise a Vertical Plate 9 and therefrom horizontally outward-extending Ribs 10. Each Vertical Plate 9 of Cooling Units 8 is located directly adjacent to the side walls of Components 1.

At its top side and underside and on the leading edges of Ribs 10, Cooling Unit 8 is tightly surrounded by Sound-muting Material 3.

Thus, between Ribs 10, there arise Ventilation Spaces 11, in whose area Ventilation Openings 4, and in the sound-muting material the appropriate Channels 5, are likewise arrayed, in order to supply the Ventilation Spaces 11 with a cooling air stream. In this area, too, Ventilation Openings 4 are positioned exactly opposite each other and in true alignment on Container 2.

As mentioned above, Vertical Plate 9 of Cooling Unit 8 is located directly adjacent to Components 1. This creates an ideal heat transfer. In effect, the surface of Component 1 is made higher by Cooling Unit 8, and better heat dispersal is thus guaranteed.

Furthermore, additional space for cooling air is created by the use of Cooling Unit 8 by means of its geometric design with horizontal Ribs 10 and Ventilation Spaces 11. Location of Ventilation Openings 4 on the front and back of Container 2 permits a directional stream of air to be forced over Components 1 and/or Cooling Unit 8.

On the underside, the Sound-muting Material 3 is to be significantly thicker (thickness D) between Cooling Unit 8 and/or Void 7 and the inner wall of the container than on the top and/or side of Cooling Units 8 (thickness d). Since the greatest vibrations occur on the underside due to gravity, it is of importance to minimize in precisely this location the resulting transfer of Unit noise to Container 2 by means of a thicker sound-muting layer.

On the one hand, the device in accordance with this invention optimally solves the problem of providing both optimal sound-reduction and adequate cooling, while on the other hand having the advantage that the sound-muting material also provides mechanical steadying of Components 1 and Cooling Units 8 in Container 2. Due to the steadying effect in accordance with the invention, the components will not be damaged by impact suffered during transport.

The sound-muting material thus serves to absorb and reduce vibrations caused by the components, noise reduction of the components, and mechanical steadying in Container 2.

Noise reduction is increased by the design of the cooling paths within the sound-muting material, since the noise is additionally muted in the Channels 5 and not carried outward via the cooling air.

What is claimed is:

1. Device for reducing the noise level of, and for cooling, a Component (1) with moving parts, comprising:
    a Container (2) in which the Component (1) is arranged and in which Ventilation Openings (4) are provided on opposing sides, through which an air stream of cooling air can flow for cooling the Component (1),
    Sound-muting Material (3) completely surrounding the Component (1) in the container, wherein Channels (5) for conducting a flow of the cooling air extend through the Sound-muting Material (3), and
    at least one Cooling Unit (8) arranged adjacent to the Component (1) for dissipating heat from the Component (1), the at least one Cooling Unit (8) being cooled by the air stream of cooling air flowing through said Ventilation Openings (4).

2. Device according to claim 1, wherein said Cooling Units (8) are provided on two sides of the Component (1).

3. Device according to claim 1, wherein each of said at least one Cooling Unit (8) comprises a Vertical Plate (9) which is adjacent to the Component (1), and horizontal Ribs (10) extending from said Vertical Plate (9).

4. Device according to claim 3, wherein said at least one Cooling Unit (8) is tightly surrounded by the Noise-muting Material (3) on the outsides of top and bottom ones of said Ribs (10) as well as on the leading edges of the Ribs (10).

5. Device according to claim 1, wherein a Void (7) is provided between a top surface of the Component (1) and said sound-muting Material (3) as well as between an underside of the Component (1) and said sound-muting Material (3).

6. Device according to claim 1, wherein said Ventilation Openings (4) in the container are arranged opposite one another and in true alignment, and that the air stream flows in a rectilinear direction.

7. Device according to claim 1, wherein at least two of the components are provided to be arranged on top of each other in the Container (2) and that there is a Void (6) between any of the components.

8. Device according to claim 7, wherein each of said at least one Cooling Unit (8) comprises a Vertical Plate (9) which is adjacent to the Component (1), and horizontal Ribs (10) extending from the Vertical Plate (9), and wherein the ventilation openings are arranged in the area of the Voids (6, 7) and in the area of Ventilation Spaces (11) present between the Ribs (10) of said at least one Cooling Unit (8).

9. Device according to claim 1, wherein the sound-muting Material (3) is thicker (D) at an underside of the Component (1) than at any other sides.

10. Device according to claim 1, wherein the Component (1) is a hard disk in a PC system.

* * * * *